Jan. 2, 1951
R. H. GODDARD
2,536,598
PREMIXING AND FUEL FEEDING ARRANGEMENT
FOR COMBUSION CHAMBERS
Filed June 25, 1947
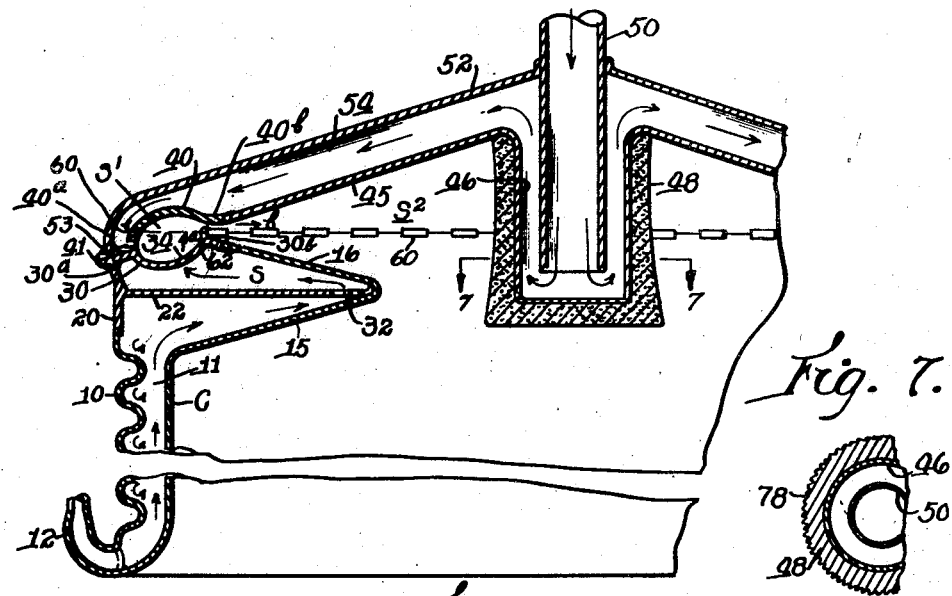
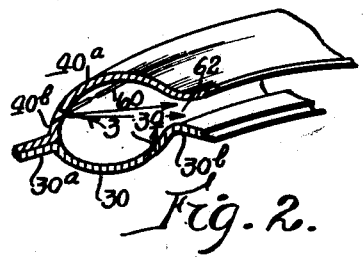
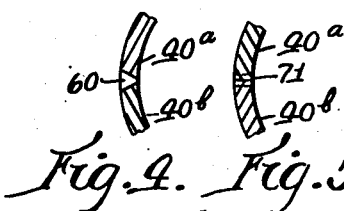
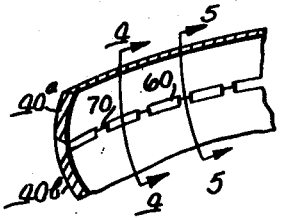
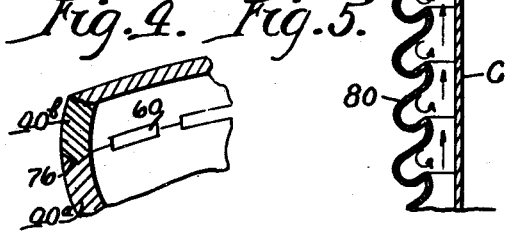
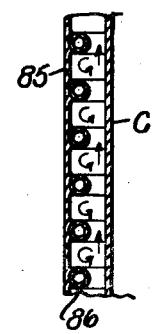
INVENTOR.
Robert H. Goddard, Dec'd.
Esther C. Goddard, Executrix.
BY Chas. T. Hawley
ATTORNEY Patented Jan. 2, 1951

2,536,598

UNITED STATES PATENT OFFICE 2,536,598

PREMIXING AND FUEL FEEDING ARRANGE-
MENT FOR COMBUSTION CHAMBERS

Robert H. Goddard, deceased, late of Annapolis,
Md., by Esther C. Goddard, executrix, Worcester, Mass., assignor of one-half to The Daniel
and Florence Guggenheim Foundation, New
York, N. Y., a corporation of New York Application June 25, 1947, Serial No. 756,861

4 Claims. (Cl. 60—44)

This invention relates to combustion chambers as used in propulsion apparatus and in which liquid fuel and a liquid oxidizant are used.

Such combustion apparatus is subjected to very high temperatures, and one object of this invention is to provide improved and effective means for cooling the combustion chamber and all parts of the fuel-feeding apparatus.

A further object of the invention is to provide improved means for injecting the combustion liquids into an annular mixing space, and for effectively intermingling said liquids, both before and after entrance thereof to the combustion chamber.

Special provision is also made for vaporizing any drops of liquid which may remain in the fuel mixture as it approaches the axis of the combustion chamber.

The invention further relates to arrangements and combinations of parts which will be hereinafter described and more particularly pointed out in the appended claims.

A preferred form of the invention is shown in the drawing, in which:

Fig. 1 is a partial sectional elevation of a combustion chamber embodying this invention;

Fig. 2 is a fragmentary perspective view of certain parts of the fuel-feeding apparatus;

Fig. 3 is a detail perspective view, looking in the direction of the arrow 3 in Fig. 2;

Figs. 4 and 5 are detail sectional elevations, taken along the line 4—4 and 5—5 in Fig. 3 respectively;

Fig. 6 is a detail perspective view showing a slight modification;

Fig. 7 is a cross-sectional plan view, taken along the line 7—7 in Fig. 1;

Fig. 8 is a partial sectional elevation showing a modification of the cooling jacket for the combustion chamber; and Fig. 9 is a view similar to Fig. 8 but showing an additional modification.

Referring to Figs. 1 to 5 and 7, the invention is shown embodied in a combustion chamber C having a corrugated outer casing 10 enclosing a jacket space 11 which is supplied with a cooling liquid, as gasoline, through a feed pipe 12.

At its upper end, the chamber C is contracted to provide an annular conical wall surface 15 and is again expanded to provide a second but reversed annular conical wall surface 16. A sleeve member 20 is secured to the upper end of the jacket casing 10 and is provided with an inwardly projecting annular partition 22, the inner edge of which is secured to the chamber C at the contracted inner portion thereof and at the junction of the conical surfaces 15 and 16.

An annular member 30 is secured at its outer edge portion 30a to the upper edge of the sleeve member 20 and at its inner edge portion 30b to the outer and upper edge of the conical chamber wall portion 16, thus enclosing a space S to which gasoline is fed from the jacket space 11 through ports 32 in the partition 22.

Ports or feed openings 34 are provided in the annular member 30, through which sprays of gasoline are injected to a mixing space S', the direction of flow being shown by the arrow a in Fig. 1.

The upper part of the space S' is enclosed by an annular member 40 having its outer portion 40a welded or otherwise secured at 41 to the outer portion 30a of the member 30. The inner portion 40b of the member 40 is connected to the outer edge portion of a member 45 forming the inner end of the combustion chamber C. The member 45 has an axial cylindrical portion 46 extending into the chamber C and encased in a sleeve or cap 48, preferably formed of carbon or other heat-resisting material.

A feed pipe 50 conducts liquid oxygen to the lower end of the cylindrical portion 46, and a jacket casing 52 extends from the pipe 50 to the outer portion 40a of the member 40, where it is secured at 53. A jacket space 54 is thus enclosed between the end member 45 and the casing 52. Liquid oxygen flows through this space 54 to ports or feed openings 60 in the annular member 40.

Sprays of liquid oxygen are thus injected substantially radially inward to the space S', as indicated by the arrow b in Fig. 1. These jets of oxygen then pick up the gasoline which is sprayed into the space S' substantially at right angles to the path of the oxygen and intersecting the flow thereof.

A relatively narrow annular passage 62 is provided between the annular members 30 and 40 and inwardly of the space S'. Inward flow of the intermingled combustion liquids from the space S' is retarded by this narrow passage 62, thus providing more time for intermingling the liquids and the vapors formed therefrom by exposure to the heat of combustion.

It will also be seen that the annular space S2 between the conical surface 16 and the end member 45 expands rapidly inward, thus allowing the intermingled liquids and gases to spread out and to thus further reduce the rate of inward movement thereof. Any drops of gasoline or liquid oxygen remaining in the mixture will engage the extensive surface of the hot carbon sleeve 48 and will be quickly vaporized by such engagement. Very effective intermingling of the combustion liquids and complete vaporization thereof is thus effected.

Preliminary combustion takes place in the space S2 but combustion is not completed until the intermingled gases have fully entered the combustion chamber and are in the space below the surface 15 and the sleeve or cap 48.

The two parts 40a and 40b of the annular member 40 (Fig. 3), are preferably formed with lugs 70 which abut as indicated at 71 in Fig. 5 and which define the ports 60 (Figs. 3 and 4) which may be of any desired width, as determined by the length of the lugs 70. The lugs 70 may be brazed or otherwise secured together.

Long narrow slots provide substantially continuous intersecting sheets of fuel and liquid oxygen.

In Fig. 6, the abutting edges of the parts 40a and 40b are respectively grooved and beveled as indicated at 76, which construction is desirable for keeping the two parts of the annular member 40 accurately concentric.

Similar lugs and edge constructions may be adapted for the parts 30a and 30b of the member 30. The coacting parts 30 and 40 are well adapted to resist the inward pressure of the liquids fed thereto and the width of the ports is effectively maintained.

The outer surface of the carbon sleeve or cap 48 may desirably be grooved or roughened, as indicated at 78 in Fig. 7, to provide additional surface and to facilitate breaking-up of the drops of combustion liquids.

The jacket casing 10 surrounding the combustion chamber C may desirably have the corrugated form shown in Fig. 1, thus providing substantially increased casing surface and also producing eddies in the liquid gasoline as indicated by the arrows. These eddies tend to project the gasoline against the wall of the chamber C, instead of allowing the gasoline to flow directly upward and to become separated from the jacket wall by a layer of gasoline vapor, as might otherwise occur.

In Fig. 8, a modified jacket casing 80 is shown in which the corrugations are more or less pointed at their inner edges, thus facilitating the formation of gasoline eddies or vortices.

In Fig. 9, a further modification is shown in which the jacket casing 85 is cylindrical and in which spaces for the formation of eddies are produced by securing tubular rings 86 in axially spaced relation along the inner face of the jacket casing 85.

In all three forms of the jacket casing, the formation of eddies is facilitated, with much improved contact between the liquid gasoline and the combustion chamber wall. Weight is also saved, as lighter and thinner jacket casings may be used. The heat-resistant construction enclosing the inner end of the feed pipe 50 is not claimed herein but forms the subject matter of divisional application Serial No. 131,463, filed December 6, 1949.

Having thus described the invention and the advantages thereof, it will be understood that the invention is not to be limited to the details herein disclosed, otherwise than as set forth in the claims, but what is claimed is:

1. In a combustion chamber having an inner end wall and a combustion area adjacent thereto, in combination, wall portions defining an annular premixing area surrounding said combustion area and defining a relatively narrow annular passage connecting said combustion and premixing areas, means to inject sprays of one combustion liquid to said premixing area from the outer peripheral surface enclosing said area and substantially radially inward through said passage, and means to inject sprays of a second combustion liquid to said premixing area along lines substantially transverse to the sprays of said first liquid.

2. In a combustion chamber having an inner end wall and a combustion area adjacent thereto, in combination, wall portions having abutting edges and defining an annular premixing area surrounding said combustion area and also defining a relatively narrow annular passage connecting said combustion and premixing areas, means to inject sprays of one combustion liquid to said premixing area and substantially radially inward through said passage, and means to inject sprays of a second combustion liquid to said premixing area along lines substantially transverse to the sprays of said first liquid, and the abutting edges of certain of said wall portions being spaced apart to provide elongated slots between said wall portions, through which slots flat liquid sprays will be injected to the premixing area of the combustion chamber.

3. The combination in a combustion chamber as set forth in claim 2, in which lugs are provided between the elongated slots and define the effective width of said slots.

4. A combustion chamber in which an inwardly expanding combustion area is defined by an outwardly conical end wall, an axial member projecting inward a substantial distance beyond said end wall, and an annular conical flange member associated with said end wall and having its inner conical apex substantially in the plane of the inner end of said axial member and substantially spaced from said axial member.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 735,683 | Thomson | Aug. 4, 1903 |
| 1,106,965 | Palmer et al. | Aug. 11, 1914 |
| 2,110,963 | Pulejo et al. | Mar. 15, 1938 |
| 2,395,114 | Goddard | Feb. 19, 1946 |